(12) United States Patent
Erkocevic-Pribic

(10) Patent No.: US 6,861,977 B2
(45) Date of Patent: Mar. 1, 2005

(54) AGILE PRT DECONVOLUTION METHOD AND SYSTEMS, AND ITS USES

(75) Inventor: Radmila Erkocevic-Pribic, Delgauw (NL)

(73) Assignee: Thales Netherland B.V., Hengelo (NL)

(*) Notice: Subject to any disclaimer, the term of this patent is extended or adjusted under 35 U.S.C. 154(b) by 0 days.

(21) Appl. No.: 10/660,786

(22) Filed: Sep. 12, 2003

(65) Prior Publication Data
US 2004/0085238 A1 May 6, 2004

(30) Foreign Application Priority Data
Sep. 23, 2002 (NL) .............................. 1021513

(51) Int. Cl.$^7$ .............................. G01S 13/00
(52) U.S. Cl. .................. 342/195; 342/17; 342/19; 342/192; 342/196
(58) Field of Search .................. 342/17, 19, 195, 342/196, 192, 160, 90, 95–98

(56) References Cited

U.S. PATENT DOCUMENTS

| | | | | |
|---|---|---|---|---|
| 6,081,221 A | * | 6/2000 | Zrnic et al. | 342/26 R |
| 6,259,397 B1 | * | 7/2001 | Sezai | 342/196 |
| 2003/0052814 A1 | * | 3/2003 | Corbrion et al. | 342/104 |
| 2004/0141548 A1 | * | 7/2004 | Shattil | 375/146 |

FOREIGN PATENT DOCUMENTS

| EP | 0 444 458 A | 9/1991 |
|---|---|---|
| FR | 2 412 852 A | 7/1979 |

OTHER PUBLICATIONS

Prati, C. et al. "Blind deconvolution for Doppler centroid estimation in high frequency SAR", , IEEE Trans on Geoscience and Remote Sensing, vol: 29 , Issue: 6, Nov. 1991, pp. 934–941.*

IEEE article by Oderland I., et al., Eagle–A High Accuracy 35 GHZ Tracking Radar, May 7, 1990, pp. 461–466.

* cited by examiner

*Primary Examiner*—Thomas H. Tarcza
*Assistant Examiner*—Isam Alsomiri
(74) *Attorney, Agent, or Firm*—Lowe Hauptman Gilman & Berner, LLP

(57) ABSTRACT

This invention relates to radar signal processing. In particular, this invention concerns signal processing of agile Pulse Repetition Time (PRT) sampled signal transmitted using spread spectrum technique. This invention solves, in particular, the incompatibility between Doppler processing and spread spectrum such providing an improved anti-jamming technique without narrowing the Doppler range. The method for deconvolution comprises combining the pulses with the same carrier in a burst, transforming the obtained signals from time to frequency domain, and deconvolving the obtained spectra. In a first embodiment of this invention, such a deconvolution method is adapted to irregular PRT sampled signal comprises an irregular samples to regular zero-padded samples conversion step between the combination and the transformation steps.

20 Claims, 3 Drawing Sheets

AGILE PRT DECONVOLUTION METHOD AND SYSTEMS, AND ITS USES

BACKGROUND OF THE INVENTION

1. Field of the Invention

This invention relates to radar signal processing. In particular, this invention concerns signal processing of agile Pulse Repetition Time (PRT) sampled signal transmitted using spread spectrum technique.

2. Discussion of the Background

Radio frequency (RF) pulse-to-pulse agility is a frequency hopping known as a spread spectrum technique. By RF pulse-to-pulse agility involves changing the carrier frequency per pulse. This implies a much wider frequency band than the minimum bandwidth required to transmit and receive a pulse.

The main advantage of RF pulse-to-pulse agility is the increase of the resistance against jamming and interference. The spread spectrum has been improving radar and communication since the forties and eighties respectively. Besides the jamming suppression, such spread spectrum can also result in a high range resolution, frequency correlation . . .

Even when the corresponding Doppler velocity remains constant within a burst (i.e. within coherent processing interval), such RF pulse-to-pulse agility implies time-varying Doppler spectra. The spectral analysis of time varying spectra means in radar application Doppler processing when Doppler frequency changes from one pulse to another.

Conventional Doppler processing can not suffice as it is based on constant frequency during a burst. This is the reason why the combination of the RF agility with coherent processing has always been considered difficult if not impossible.

Even when radar signals with the Doppler phase could be extracted per pulse, major problems would just begin in a Doppler processing, mainly because the received Doppler phase as well as the target radar cross section could differ for different carriers.

In a fully coherent radar, all frequencies are generated from one single reference oscillator, so the phase coherence is inherent. Carrier frequency $f_{RF}$, intermediate frequencies $f_A$ and $f_{LO}$, sampling frequency $f_S$ and pulse repetition frequency $f_{PRF}$ are generated from one and only oscillator. In addition, RF agile radar requires more than one intermediate frequency $f_{A,n}$ so that a number of different frequency per pulse $f_{RF,n}$ can be generated.

Coherent integration necessitates non-random phases of reflected pulses. In a coherent radar, the transmitted phase is known, but such a well-controlled phase may be damaged during the propagation.

At time delay t after the nth pulse, the received radar signal $s(t_n)$, $t_n = \tau + (n+1)t_{PRT}$ (after analogue-digital conversion), can be modelled as follows:

$$s(t_n) = \alpha \cdot g(\omega t_n - \theta) \cdot e^{j\phi(t_n)} \Rightarrow e^{j\phi(t_n)}$$

where $\alpha$, $g(\ )$ and $\phi(\ )$ represent the complex target echo depending on the target radar cross section, the two-way antenna voltage gain pattern with the scan rate $\omega$ and the target azimuth $\theta$, and the instantaneous phase, respectively. The antenna pattern is assumed to be constant within a burst, e.g. $g(\ )=1$. In general, the pulse repetition time $t_{PRT}$ will also be constant.

Another drawback of the RF agility is that the RF agility can make the target echo $\alpha$ fluctuate independently from pulse to pulse, if a target contains many scatterers instead of one single scatterer and, moreover, if the individual scatterers move randomly.

If one (dominant) scatterer and no pulse-to-pulse dependence are assumed, the phases of reflected pulses remain non-random. Other Doppler processing than discrete Fourier transform is needed, unless samples are gathered from the pulses with the same frequency.

In an extreme target model such as e.g. the Swerling model II, many scatterers contribute equally to the echo signal. The resulting amplitude is Rayleigh distributed and the resulting phase can only be assumed to be uniformly distributed in $[0, 2\pi]$. Accordingly, no Doppler processing but incoherent integration only is applicable.

By assuming reflectors not interacting or moving randomly, there are non-random phases needed. However, the amplitude variability is significantly less troublesome than the variability of the phase. In general, it would add noise in results of the Doppler processing.

Decorrelation of radar echoes implies no coherence, i.e. no knowledge of the phases or, finally, of radial velocities. Fortunately, there are islands of frequency correlation that depend on the target dimensions and position but also on radio frequency and its change. Thus, the RF agility pattern can be chosen that result in correlated radar echoes what enable coherent processing.

In any case, time-varying spectra are present in a coherent Doppler RF agile pulse radar. Thus, the Fourier analysis does not apply anymore.

In the article "High Accuracy 35 GHz Tracking Radar", Oderland, I., Nordlöf, Leijon, B., *Proceedings of IEEE International Radar Conference* 1990, time-varying spectra were avoided by combining pulses with the same carrier. This article discloses that such method can be applied only with constant pulse repetition time (PRT). However, this waveform lowers Doppler range. This means that the range of possible unambiguous Doppler velocities decreases fast with increasing number of different carrier frequencies in a burst.

SUMMARY OF THE INVENTION

This invention solves the above-mentioned drawbacks, in particular solving the incompatibility between Doppler processing and spread spectrum such providing an improved anti-jamming technique without narrowing the Doppler range.

An object of this invention is a method for deconvolution comprising the following steps:

[S0] Combining the pulses with the same carrier in a burst,

[S2] Transforming the obtained signals from time to frequency domain,

[S6] Deconvolving the obtained spectra

In a first embodiment of this invention, such a deconvolution method is adapted to irregular PRT sampled signal comprising an irregular samples to regular zero-padded samples conversion step [S1] between the combination and the transformation steps.

A further object of this invention is a deconvolution system of pulse repetition time sampled signal $x(t_m)$ characterised in that it comprises:

Means for combining the pulses with the same frequency in a burst,

Means for transforming these pulses from time to frequency domain;

Mean for deconvolving of the spectra.

In a first embodiment of this further object of the invention, such a deconvolution system means for converting irregular samples $x(t_m)$ to regular zero-padded samples $r(iT_e)$, these means for converting receives the irregular pulses grouped by frequency from the means for combining and transmits the zero-padded samples to the means for transforming.

Another object of this invention is an emitting/receiving system using such above described deconvolution method comprising an antenna 1, a reference oscillator 6, an analogue to digital converter 13 and a processor which implement the above described deconvolution method.

Moreover, another object of this invention is the use of such deconvolution method in radar system.

A further object to this invention is the use of such deconvolution method as anti-jamming.

BRIEF DESCRIPTION OF THE DRAWINGS

Further features and advantages of the invention will be apparent from the following description of examples of embodiments of the invention with reference to the drawing, which shows details essential to the invention, and from the claims. The individual details may be realised in an embodiment of the invention either severally or jointly in any combination.

MORE DETAILED DESCRIPTION

Figure 1:
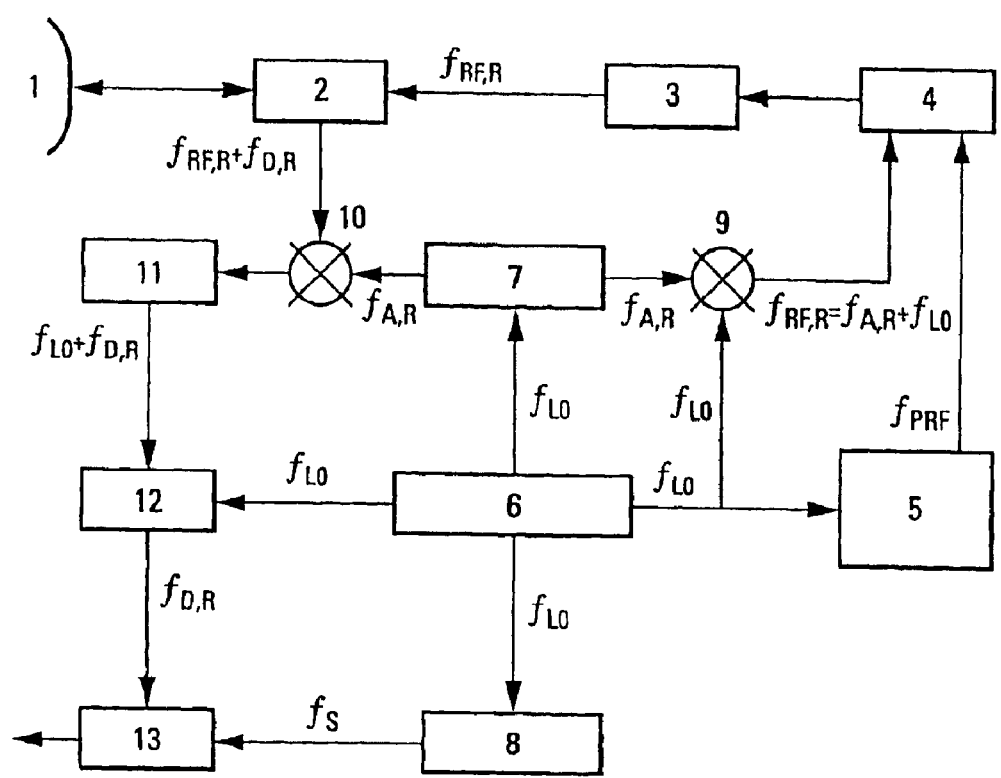
FIG. 1, block diagram of coherent Doppler RF agile pulse radar front-end according to the invention, FIG. 2, overlapped bursts with irregular pulse repetition time samples according to the invention, FIG. 3, flow chart of significant steps in the deconvolution method according to the invention.

FIG. 1 shows a block-diagram of the transmitter receiver part in a radar, which uses the deconvolution method according to the invention. The antenna 1 of the radar can consist of, for example, a fixed-radiating antenna which is connected to a duplexer 2, consisting of, for example, a circulator.

To the duplexer 2 is connected in a manner known per se a transmitting unit 3 and a mixer 10 whose output is connected to the intermediate frequency amplifier 11. A local oscillator 6 is connected to the mixer 10 via a frequency multiplier 7 and transmits a signal whose frequency $f_{A,n}$ constitutes an intermediate frequency which is a multiple of the local intermediate frequency $f_{LO}$: $f_{A,n}=K_{A,n} f_{LO}$.

A pulse modulator 4 is connected to the transmitting unit 3, which consist of an RF amplifier, for example, and, indirectly, to the local oscillator 6. The pulse modulator 4 modulates the signal over a certain predetermined carrier frequency $f_{RF,n}=f_{A,n}+f_{LO}$ with a certain predetermined pulse repetition frequency $f_{PRF}=f_{LO}/K_{PRF}$. The carrier frequency $f_{RF,n}$ is given by the operator 9 which adds a first intermediate frequency $f_{LO}$ received directly from the reference local oscillator 6 and a second intermediate frequency $f_{A,n}$ generated by the frequency multiplier 7. The pulse repetition frequency $f_{PRF}$ is generated by a frequency divider 5 connected to the output of the reference local oscillator 6, $f_{PRF}=f_{LO}/K_{PRF}$. It is made irregular by changing $K_{PRF}$.

Furthermore, a signal-treating unit 12 is connected to the output of the intermediate frequency amplifier 11 and to the reference local oscillator 6. It consists of a phase detector, which reproduces the Doppler frequency and transmits it to an Analogue to Digital (A/D) Converter 13. The Analogue to Digital (A/D) Converter 13 is also connected to the output of a frequency multiplier 8, which generates a sampling frequency $f_s$. The frequency multiplier 8 is connected to the reference local oscillator 6 so the sampling frequency depend on the intermediate frequency: $f_s=K_S f_{LO}$.

The units shown in FIG. 1 correspond to those in a coherent Doppler RF agile pulse radar front end according to the invention. All frequencies are generated from one single reference oscillator, so that the phase coherence is inherent. The carrier frequency $f_{RF}$, the intermediate frequencies $f_A$ and $f_{LO}$, the sampling frequency $f_s$ and the pulse repetition frequency $f_{PRF}$ are generated from one and only oscillator 6.

The amplifiers 3 and 11 consist of RF amplifier in order that the front end is an RF radar's one. In addition, the agile radar requires more than one intermediate frequency $f_{A,n}$ so than a number of different carrier frequency $f_{RF,n}$ can be generated.

Figure 2:
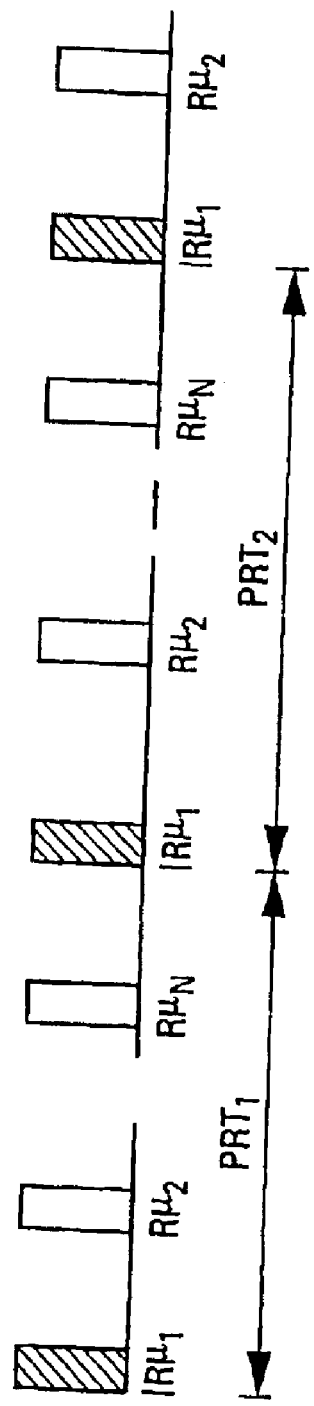

FIG. 2 shows overlapped bursts with irregular pulse repetition time samples according to a first embodiment of the invention. In a first step of the deconvolution method the pulses with same RF are combined as illustrated by the hatched RF1 pulses.

Irregular sampling has not been used as widely as uniform sampling because the time and frequency analyses of irregular samples are rather involved.

Random sampling usually involves random numbers added to regular sampling times. The DFT-based power spectrum of random samples consists of the power spectrum of signal plus additive uncorrelated noise. For example, even with a noise-free signal sampled at the Nyquist sampling rate, the output signal-to-noise ratio could be 1 only.

Deterministic irregular sampling involves repeating periodically the same sequence of K irregular intervals with the mean sampling interval $T_s$. The sampling is usually called interlaced when K=2, and multirate or bunch when K has an arbitrary length. Since such a sampling set contains K regular sampling sets, DFT gives K peaks (per one frequency component of a signal) within the range limited by the sampling frequency $1/T_s$.

For any regular sampling set $\{nT\}$, such that $T \leq 1/(2B)$, a real signal $x(t)$ limited to a frequency band B, writes as $$x(t) = \sum_n x(nT) \cdot \mathrm{sinc}[2B(t-nT)].$$

Irregular samples are well understood in theory, but their method are usually too complicated. For an irregular sampling set $\{t_n\}$, the reconstruction with bi-orthogonal bases $\{\mathrm{sin}\, c[2B(t-nT)]\}$ and $\{\Psi_n(t)\}$, writes as:

$$x(t) = \sum_n c_n \cdot \mathrm{sinc}[2B(t-t_n)] = \sum_n x(t_n)\Psi_n(t)$$

where $c_n$ is the inner product of $x(t)$ with $\{\Psi_n(t)\}$. If the set $\{t_n\}$ is limited as $|t-t_n|<1/(8B)$, $\Psi_n(t)$ is a Lagrange interpolation function. Basis functions can also be frames, i.e. bases whose orthogonality is not required. The frame conditions are much weaker and more useful for practical purpose.

The NSSL magnitude deconvolution proposed in the American patent U.S. Pat. No. 6,081,221 is used for the ground radar Doppler processing of interlaced sampling scheme. In general, an NSSL sampling set $\{t_m\}$ is multirate with rate K and the mean interval $T_K$. An NSSL time interval $(t_{m+1}-t_m)$, as well as the whole sequence $KT_s$, are integer multiples of the largest common time interval $T_e$, $KT_s=LT_e$, so that the smallest regular set $\{iT_e\}$ can contain $\{t_m\}$, $\{t_m\} \subset \{iT_e\}$.

Thus, the irregular samples $x(t_m)$ are converted to the zero-padded samples $r(iT_e)$ being product of a sampling scheme $c_i$, $c_i=\delta(iT_e-t_m)$, and the regular samples $x(iT_e)$.

Based on this relation: r=diag(c).x (in the vector form), the spectrum of x, can be derived as follows:

$$dft(r)=dft(c)*dft(x)=C\cdot dft(x)$$

$$|dft(x)|=|C|^{-1}\cdot|dft(r)|$$

where C is a Toeplitz matrix whose row vectors are cyclically shifted dft(c). Since C is singular and, thus not invertible, the NSSL idea is to use the magnitudes instead. It is applicable only if there are no complex additions in the product C·dft(x). This condition implies the bandwidth of x, but it is not a constraint for most radar.

The spectrum |dft(r)| contains L replicas of the spectrum |dft(x)| that are weighted by coefficient from |dft(c)|, in a frequency range which is L/K times wider than the mean sampling frequency $f_s$. The deconvolution gives the strongest replica, i.e. the signal spectrum |dft(x)|.

Only the NSSL method supports frequencies above the Nyquist frequencies, namely up to L/K times the sampling frequency.

In track radar, where expected Dopplers are reasonably known, the signal spectra supported by NSSL may suffice. Namely, using the magnitudes in $$dft(r)=dft(c)*dft(x)=C\cdot dft(x)$$

$$|dft(x)|=|C|^{-1}\cdot|dft(r)|$$

implies that the spectrum of the signal x cannot be broader than N/L spectral lines, where N and L are the number of regular samples (i.e. the length of the vectors r and x) and the length of the basic irregular sequence, respectively. It can also work in the cases where the signal spectrum is broader than N/L, but no distance between the spectral lines can be an integer multiple of N/L.

The range of unambiguous frequencies may expand limitlessly, but clutter filtering becomes more involved with increasing complexity of the sampling.

For this purpose, an embodiment of the deconvolution method comprises a conversion step. It consists in the irregular samples with the same RF to regular zero-padded samples conversion. This is one for each radio frequency.

Figure 3:
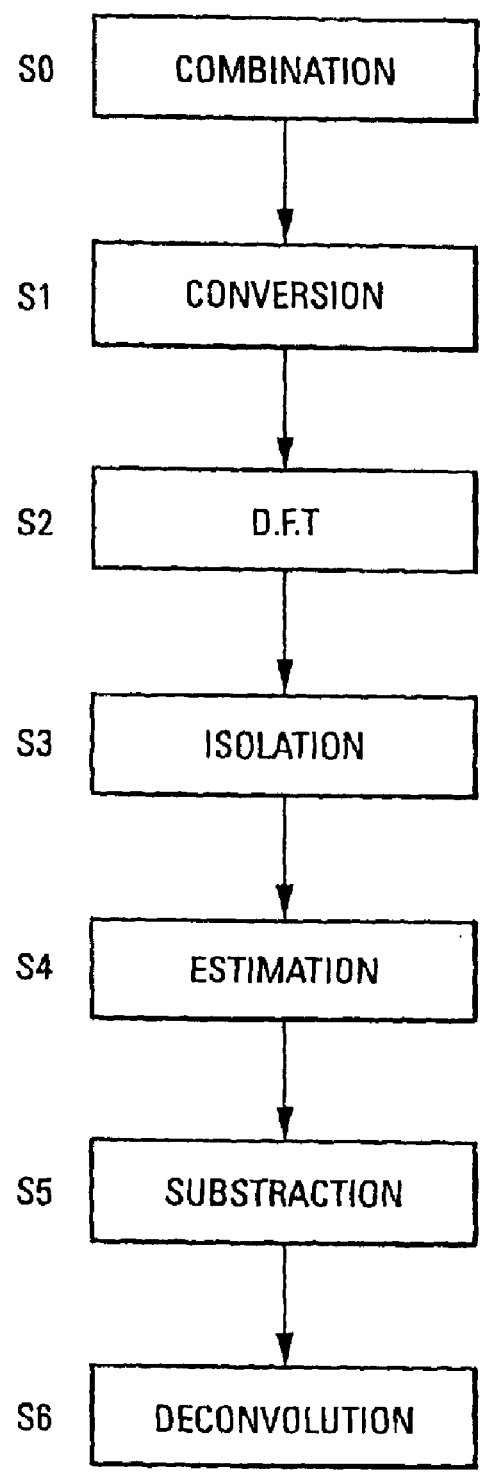

The deconvolution method according to the invention is illustrated by FIG. 3. This method can be summarised by the following steps:

[S0: combining step] The pulses are combined by CARRIER (Radio frequency)

[S2: DFT step] The spectrum dft(r) of these regular samples is computed;

[S6: deconvolution] The remaining spectra are deconvolved.

In a first embodiment of the deconvolution method implemented for irregular pulse repetition time samples, a further step has been added between the combining step [S0] and the DFT step [S2]. This step is:

[S1: conversion step] The irregular samples $x(t_m)$ are converted to regular samples $r(iT_e)$.

The following other steps may exist between the DFT step [S2] and the deconvolution step [S6]:

[S3: isolation step] The clutter spectra are isolated by assuming clutter spreads over more than a few range gates;

[S4: estimation] The clutter spectral lines are estimated from the mean and the width of the isolated clutter spectra;

[S5: subtraction] The clutter spectra are subtracted from the total spectrum dft(r);

Wherein the steps S5 and S6, the computation are adjusted to the clutter type by the clutter spectra given by step S3.

In a second embodiment, the spectrum dft(c) can also be computed and its L non-zero components found in step S2. In third embodiment, the amplitudes of the clutter spectra can be estimated in step S4. So, the convolution operations can be reduced, based on the L non-zero spectral components between the steps S5 and S6. In other embodiments, these second and third embodiments can be combined.

Furthermore, the clutter spectral lines can be estimated from the mean in $\bar{f}_d=\arg[r(\tau_i)]/(2\pi\tau_i)$ and/or the width in $$\sigma_f = \frac{\sqrt{\ln[\rho(\tau_1)/\rho(\tau_2)]}}{\sqrt{6}\,\pi\tau_1} \Rightarrow \sigma_{cl>3}\sigma_f$$

of the isolated spectra [S4]. Moreover, the amplitudes of the clutter spectra can be estimated by $$\hat{\underline{g}}_{cl}(i,k) = \begin{cases} d_k \sum_l d_l^* \cdot z_{i+1+(l-1)\frac{N}{L}} & \text{for } i \geq 0 \\ d_{k,L} \sum_l a_{i,L}^* \cdot z_{i+1+l\frac{N}{L}} & \text{for } i < 0 \end{cases} \quad [S4].$$

The convolution operation can be reduced in $$dft(r)=dft(c)*dft(x)=C\cdot dft(x)$$

$$|dft(x)|=|C|^{-1}\cdot|dft(r)|$$

before the remaining spectra in $$dft(r) = dft(c)*dft(x) = C\cdot dft(x)$$

$$|dft(x)| = |C|^{-1}\cdot|dft(r)|$$

are deconvolved [S6].

One advantage of the deconvolution method according to the invention is that it works above the Nyquist frequencies, offers filtering method for any kind of clutter, and anti-jamming.

More generally, such deconvolution system may be used to deconvolve any kind of irregular sampled signal using spread spectrum technique not only radar one.

What is claimed is:

1. A deconvolution method of agile pulse repetition time sampled signals $x(t_m)$ comprising the following steps:

combining the pulses with the same carrier frequency in a burst;

transforming the obtained signals from time to frequency domain; and deconvoluting of a spectra of the frequency domain.

2. The deconvolution method according to claim 1, further comprising computing of the discrete Fourier transform of the samples by frequency within the time to frequency transformation step.

3. The deconvolution method according to claim 2 further comprising, if $x(t_m)$ is an irregular pulse repetition time sampled signal, an irregular samples $x(t_m)$ to regular zero-padded samples $r(iT_e)$ conversion step between the combination and the time to frequency transformation steps.

4. The deconvolution method according to claim 2 further comprising, within the time to frequency transformation step, the following sub-steps:

computing a sampling scheme spectrum; and searching L non-zero components of the sampling scheme spectrum.

5. The deconvolution method according to claim 4 further comprising, if $x(t_m)$ is an irregular pulse repetition time sampled signal, an irregular samples $x(t_m)$ to regular zero-padded samples $r(iT_e)$ conversion step between the combination and the time to frequency transformation steps.

6. An emitting/receiving system comprising:

an antenna;

a reference oscillator;

means for synthesising a carrier frequency connected to the reference oscillator, means for synthesising a pulse repetition frequency connected to the reference oscillator; and an analogue to digital converter and a processor comprising the processor implements the deconvolution method according to claim 2.

7. The deconvolution method according to claim 1, further comprising, within the time to frequency transformation step, the following sub-steps:

computing a sampling scheme spectrum; and searching L non-zero components of the sampling scheme spectrum.

8. The deconvolution method according to claim 7 further comprising, if $x(t_m)$ is an irregular pulse repetition time sampled signal, an irregular samples $x(t_m)$ to regular zero-padded samples $r(iT_e)$ conversion step between the combination and the time to frequency transformation steps.

9. The deconvolution method according to claim 1 further comprising, if $x(t_m)$ is an irregular pulse repetition time sampled signal, an irregular samples $x(t_m)$ to regular zero-padded samples $r(iT_e)$ conversion step between the combination and the time to frequency transformation steps].

10. The emitting/receiving system comprising:

an antenna;

a reference oscillator;

means for synthesising a carrier frequency connected to the reference oscillator, means for synthesising a pulse repetition frequency connected to the reference oscillator; and an analogue to digital converter and a processor comprising the processor implements the deconvolution method according to claim 9.

11. The deconvolution method according to claim 1 further comprising, between the time to frequency transformation step and the deconvolution step, the following steps:

isolating of the clutter spectra by assuming clutter spreads over more than a few range gates;

estimating of the clutter spectral lines from the mean and the width of the isolated clutter spectra; and subtracting of the estimated clutter spectra from the total spectrum.

12. An emitting/receiving system comprising:

an antenna;

a reference oscillator;

means for synthesising a carrier frequency connected to the reference oscillator;

means for synthesising a pulse repetition frequency connected to the reference oscillator; and an analogue to digital converter and a processor comprising the processor implements the deconvolution method according to claim 1.

13. The emitting/receiving system according to claim 12, wherein said system is a radar system.

14. The deconvolution method according to claim 1, wherein said method is performed in a radar system.

15. The method according to claim 1, wherein said method is performed as an anti-jamming method.

16. A deconvolution system of agile pulse repetition time sampled signal $x(t_m)$ comprising:

means for combining the pulses with the same frequency in a burst;

means for transforming these pulses from time to frequency domain; and means for deconvolving of a spectra of the frequency domain.

17. The deconvolution system according claim 16, further comprising means for converting irregular samples $x(t_m)$ to regular zero-padded samples $r(iT_e)$, these means for converting receiving the irregular pulses grouped by frequency from the means for combining and transmits the zero-padded samples to the means for transforming.

18. The deconvolution system according to claim 17, further comprising between the means for transforming and the means for deconvolving:

means for isolating the clutter spectra in dft(r) by assuming clutter spreads over more than a few range gates;

means for estimating the clutter spectral lines from the mean and the width of the isolated clutter spectra; and means for subtracting the estimated clutter spectra from the total spectrum.

19. The deconvolution system according to claim 18, further comprising between the means for transforming and the means for deconvolving:

means for isolating the clutter spectra in dft(r) by assuming clutter spreads over more than a few range gates;

means for estimating the clutter spectral lines from the mean and the width of the isolated clutter spectra; and means for subtracting the estimated clutter spectra from the total spectrum dft(r).

20. The deconvolution system according to claim 16, wherein said system is a radar system.

\* \* \* \* \*